April 30, 1968  L. A. MOORE  3,380,558
SELF-ADJUSTING UNWIND BRAKE
Filed Dec. 6, 1966
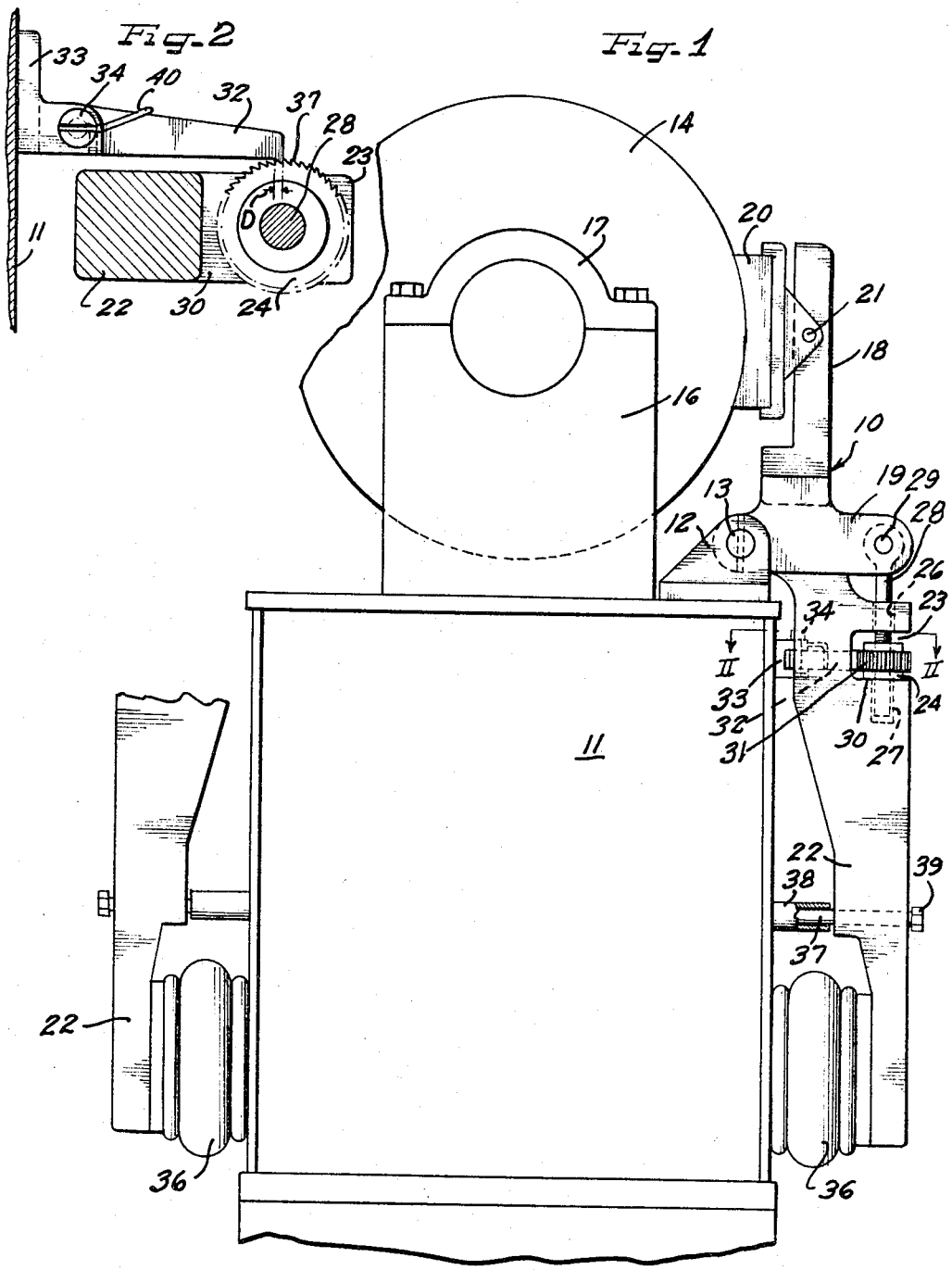
INVENTOR.
Lawrence A. Moore
BY Hill, Sherman, Meroni, Gross & Simpson
ATTORNEYS

United States Patent Office 3,380,558
Patented Apr. 30, 1968

3,380,558
SELF-ADJUSTING UNWIND BRAKE
Lawrence A. Moore, King of Prussia, Pa., assignor to Beloit Eastern Corporation, Downington, Pa., a corporation of Delaware
Filed Dec. 6, 1966, Ser. No. 599,513
6 Claims. (Cl. 188—74)

This invention relates generally to a web tension device and more particularly to a pneumatically controlled brake for use with an unwinder roll of paper web handling apparatus. Specifically, the present invention is directed to a self-adjusting brake assembly which senses the amount of wear of a brake shoe to adjust a mechanical linkage between a pair of brake arms.

After the manufacture of a paper web, it is wound on a large roll. However, in preparation of the paper web for ultimate use, the web is unwound from the large roll for trimming of the edges and slitting the web, and the web is then cut into predetermined shorter lengths or rewound on another roll or a multiplicity of rolls.

During this portion of the paper web handling process, the tension of the web, passing from the unwinder roll to a take-up or winder roll, must be controlled to a substantially constant predetermined tension. Therefore, a brake is required to control the retardation of rotation of the unwinder roll from which the paper web is drawn. During continuous periods of operation, the brake shoe, which engages the brake drum, tends to wear away thereby requiring adjustment of the brake assembly. In high production paper making machines the wear of the brake shoe may occur in a relatively short period of time since the paper making machine is operated continuously at high speeds.

Heretofore, brake systems used to control the operation of unwinder rolls have been relatively complex requiring intricate and continual adjustments for proper operational performance. Furthermore, the construction of prior art assemblies is such that maintenance accessibility is inconvenient. Also, prior art assemblies require an excessive number of intricately machined parts. In addition, brake assemblies of the prior art have been large and awkward, and the arms used to apply braking pressure to control the unwinder roll extend upwardly from their associated brake drum thereby detracting from the overall convenience and operation of the brake assembly.

Therefore, one of the primary objects of the present invention is to provide a brake assembly for unwinder rolls which is relatively simple in construction and which has a minimum number of component parts.

Another object of the present invention is to provide a brake assembly for unwinder rolls which is self-adjusting to compensate for the wear of the brake shoe during normal operation.

Another object of the present invention is to provide a brake assembly for unwinder rolls which is constructed so that maintenance accessibility is convenient.

Yet another object of the present invention is to provide a brake assembly for unwinder rolls wherein the load arms, which are used to apply brake pressure to an associated brake drum, require no biasing means, such as springs, to disengage the brake shoe from the brake drum.

A feature of the present invention is the provision of a two-piece force transfer arm which is connected together for movement by an adjustable link. The length of the link is varied in accordance with the distance moved by the force transfer arm to compensate for wear of the brake shoe.

Briefly, the brake assembly of the present invention includes a support member which carries a brake drum. The brake drum is connected to an unwinder roll to rotate therewith. A first arm is pivotally mounted on the support and extends toward the surface of the brake drum, and a second arm is pivotally mounted on the support and extends in a direction so as to have its free end adjacent the support member. A pneumatic chamber is positioned between the support member and the free end of the second arm and is inflatable to urge the free end of the first arm against the brake drum to control the amount of frictional force applied thereto. However, as the brake shoe material wears away, the distance which the first and second arms move about their pivot point increases. Therefore, a ratchet and pawl arrangement are provided to control the effective length of a link which is connected between the first and second arms.

These and other objects and features of the present invention will be more fully realized and understood from the following detailed description when taken in conjunction with the accompanying drawing wherein like reference numerals throughout the various views of the drawings are intended to designate similar elements or components and wherein:

FIGURE 1 is an elevational view showing a brake assembly which is constructed in accordance with the principles of this invention; and FIGURE 2 is a top plan view taken along the line II—II of FIGURE 1 showing the ratchet and pawl arrangement which is used to automatically adjust the position of the brake shoe relative to the brake drum.

As seen in FIGURE 1 a brake assembly designated by reference numeral 10 is pivotally mounted on a support 11. A boss 12 is formed on the support 11 for receiving a pin 13 to secure the brake assembly 10 to the support 11 so that a portion of the brake assembly 10 is selectively engageable with a brake drum 14. The brake drum 14 is supported for rotation by a bearing support 16 and a bearing cap 17.

The brake assembly 10 includes a brake arm 18 which has one end thereof mounted to the boss 12 by the pin 13 and the other end thereof extending toward the outer surface of the brake drum 14. The brake arm 18 further includes an extended portion 19 which extends in a direction away from the pin 13 and the brake drum 14. Secured to the free end of the brake arm 18 is a brake shoe 20 which is pivotally mounted by a pin 21. It should be noted that the center of mass of the brake arm 18, including the extended portion 19 and the brake shoe 20, is at a position extending away from the pin 13 and the brake drum 14. Therefore, the brake arm 18 will tend to rotate about the pin 13 solely by gravitational force to thereby disengage the brake shoe 20 from the surface of the brake drum 14 without the use of biasing means. Although the brake shoe 20 is shown pivotally connected to the brake arm 18, it will be understood that the brake shoe 20 may be fixedly secured to the brake arm 18.

Also associated with the brake assembly 10 is a brake arm 22 which is connected to the boss 12 by the pin 13. The brake arms 18 and 22 are independently movable about the pin 13. The brake arm 22 is provided with a C-shaped notch 23 for receiving a threaded collar 24. The material which forms the extended portion of the C-shaped notch 23 is bored to form an aperture 26 and a blind hole 27.

A link 28 passes through the aperture 26 and extends into the blind hole 27 and is threadedly secured to the collar 24. The link 28 is pivotally secured to the extended portion 19 by suitable means such as a pin 29. As seen on the drawing, the lower end of the collar 24 is in butting relation with a surface 30 which is formed by the C-shaped notch 23. Therefore, the effective length of the link 28 is measured between the center of the pin 29 and the bottom surface of the collar 24 which engages the surface 30. Since the collar 24 is threadedly connected to the link 28, the effective length of the link can be changed. This feature varies the position of the brake arm 18 relative to the brake arm 22 so as to move the brake arm 18 closer to the brake drum 14.

Therefore, the present invention is directed to means for automatically adjusting the effective length of the link 28 to control the position of the brake shoe 20 relative to the brake drum 14. This is accomplished by providing the threaded collar 24 with a plurality of ratchet teeth 31 which are engageable with a pawl 32. The pawl 32 is pivotally mounted to a boss 33 by a screw 34. The boss 33 is fixedly secured to the base 11 by suitable means such as screws or welding.

An expandable chamber 36 having resilient wall members is positioned between the support 11 and the free end of the brake arm 22. Therefore, should the chamber 36 expand, the brake arm 22 will be rotated about the pin 13 thereby urging the surface 30 against the collar 24. This action will cause the link 28 to transmit the force to the brake arm 18 and urge the brake shoe 20 against the brake drum 14.

To prevent the brake arm 22 from moving beyond the limits of expansion of the chamber 36, a guide bolt 37 is secured to the support 11 and extends through the brake arm 22. A stop 38 is placed about the guide bolt 37 between the support 11 and the brake arm 22 to limit the amount of travel of the brake arm 22 toward the support 11. Also, the head 39 of the bolt 37 forms a stop to limit the movement of the brake arm 22 away from the support 11.

The brake arm 22 is so designed so as to have its center of mass located a distance away from the pin 13 and the brake drum 14. Therefore, the brake arm 22 will tend to rotate about the pin 13 solely by gravitational force, similar to that of the brake arm 18, to disengage the brake shoe 20 from the brake drum 14.

As best seen in FIGURE 2, the pawl 32 is urged against the ratchet teeth 31 by a spring 40. Therefore, as the brake arm 22 moves about the pin 13, the ratchet teeth and pawl 32 will tend to rotate the collar 24 in such a manner as to increase the effective length of the link 28. Therefore, should the brake shoe 20 wear sufficient to allow the collar 24, which is connected to the brake arm 22, to move a distance D, which is equal to the distance of one of the teeth on the collar 24, the pawl will engage one of the teeth and upon deactuation of the brake assembly 10, the pawl will rotate the collar 24. Therefore, each time the brake assembly is deactuated after operation, and the brake shoe 20 has worn sufficient to cause the collar 24 to move a distance D, the collar will be rotated by the pawl 32 so as to change the effective length of the link 24 and position the brake shoe 20 more closely to the surface of the brake drum 14.

Therefore, the present invention provides a simple and effective means for adjusting a brake assembly which is associated with an unwinder roll. It will be understood that the brake assembly 10 may be provided in pairs on opposite sides of the brake drum 14, or a plurality of brake assemblies may be provided along the axis of the brake drum as desired. Therefore, variations and modifications may be effective without departing from the spirit and scope of the novel concepts of the present invention.

I claim as my invention:

1. A brake assembly for controlling the retardation of rotation of a roll on a web unwinder, comprising:
    a support including pivot means;
    a brake drum rotatably mounted on said support and spaced from said pivot means;
    a first arm having one end thereof connected to said pivot means and the other end thereof extending toward the surface of said brake drum;
    a brake shoe mounted on said first arm at said other end and selectively engageable with said brake drum;
    a second arm having one end thereof connected to said pivot means and the other end thereof adjacent said support;
    a link connected between said first and second arms to cause said first and second arms to move together in the direction for applying braking force to said brake drum;
    an expandible fluid receiving chamber mounted between said support and said other end of said second arm to urge said second arm about said pivot means thereby moving said other end of said first arm toward said brake drum to urge said brake shoe against said drum; and
    adjustable means including a sensing member mounted on said support for sensing the distance of movement of said first and second arms about said pivot means to adjust the length of said link after said first and second arms have moved about said pivot means a predetermined distance.

2. The brake assembly of claim 1 wherein said adjusting means includes a threaded collar threadedly secured to said link to adjust the effective length thereof; and a plurality of ratchet teeth formed about the periphery of said collar and engageable with said sensing means, the distance between each of said ratchet teeth on said collar being equal to said predetermined distance.

3. The brake assembly of claim 2 wherein said sensing means is a pawl which is urged against said ratchet teeth to cause rotation of said collar when said first and second arms have moved a distance equal to said predetermined distance.

4. The brake assembly of claim 3 further including a guide shaft secured to said support and passing through said second arm intermediate its ends, and a stop at each end of said guide shaft to limit the travel of said second arm.

5. The brake assembly of claim 4 wherein said first and second arms are caused to move about said pivot means in a direction to remove the braking force from said drum solely by gravitational force.

6. The brake assembly of claim 1 further including an extended portion formed on said first arm and extending outwardly from said brake drum and said pivot means, said extended portion pivotally receiving one end of said link, said second arm including a C-shaped notch and an aperture passing through said second arm and perpendicular to the extended portions of said C-shaped notch and substantially intermediate thereof for receiving the other end of said link; and a threaded collar being threadedly secured to said link and positioned within said C-shaped notch and abutting said second arm, the effective length of said link being measured between its pivotal end and said collar; and a plurality of ratchet teeth formed about the periphery of said collar and engageable with said sensing means to rotate said collar when said first and second arms move about said pivot means a predetermined distance from a rest position and then back to said rest position to adjust the effective length of said link.

References Cited

UNITED STATES PATENTS

| 3,103,991 | 9/1963 | Flinn | 188—79.5 |
| 3,199,640 | 8/1965 | Thompson | 188—196 |

DUANE A. REGER, *Primary Examiner.*